F. NISHWITZ.
Harrow and Clod Crusher.

No. 225,634. Patented Mar. 16, 1880.

WITNESSES
Wm A. Stinkle
Wm T. Kilgore

INVENTOR
Frederick Nishwitz,
By his Attorneys
Baldwin, Hopkins & Peyton

UNITED STATES PATENT OFFICE.

FREDERICK NISHWITZ, OF MILLINGTON, NEW JERSEY.

HARROW AND CLOD-CRUSHER.

SPECIFICATION forming part of Letters Patent No. 225,634, dated March 16, 1880.

Application filed September 17, 1879.

*To all whom it may concern:*

Be it known that I, FREDERICK NISHWITZ, of Millington, in the county of Morris and State of New Jersey, have invented certain new and useful Improvements in Combined Harrow and Clod-Crusher, of which the following is a specification.

The general object of my invention is to produce a cheap, simple, and effective agricultural implement, which, by being simply dragged over the surface of the ground, will at a single operation level the ground and crush clods, pulverize the soil, and harrow or cultivate it.

The first part of my invention consists in the combination of a leveler and clod-crushing device, a rigid tongue, a gang-bar or cultivator-frame, with teeth or other suitable devices secured to and in rear of the leveling device, and a driver's seat mounted on a standard secured to and projecting backward from the leveling device or tongue-heel, to bring the weight of the driver, when in the seat, mainly over or upon the gang-bar, so that when the implement is dragged over the ground the teeth are caused to penetrate the soil, and the leveling device is held to its work, caused to move over and upon or close to the surface to crush clods, &c., and is made to gage the depth of cultivation by sustaining such portion of the weight of the implement and the driver thereon which is in excess of that required to cause the cultivating devices to penetrate to the desired extent.

The next part of my invention consists in the combination of the leveler or clod-crusher, the rigid tongue, the driver's seat supported on the rigid part of the implement, (the leveler or the tongue,) a hinged gang-bar or cultivator-frame in rear of the leveler, and over which the seat is located, and means for adjusting and holding as adjusted the angular relations or relative vertical positions of the leveling and cultivating parts of the implement, whereby, in transportation, the driver's weight and the weight of the implement may be sustained mainly upon the leveler, and in operation the depth of cultivation may be controlled.

Figure 1:
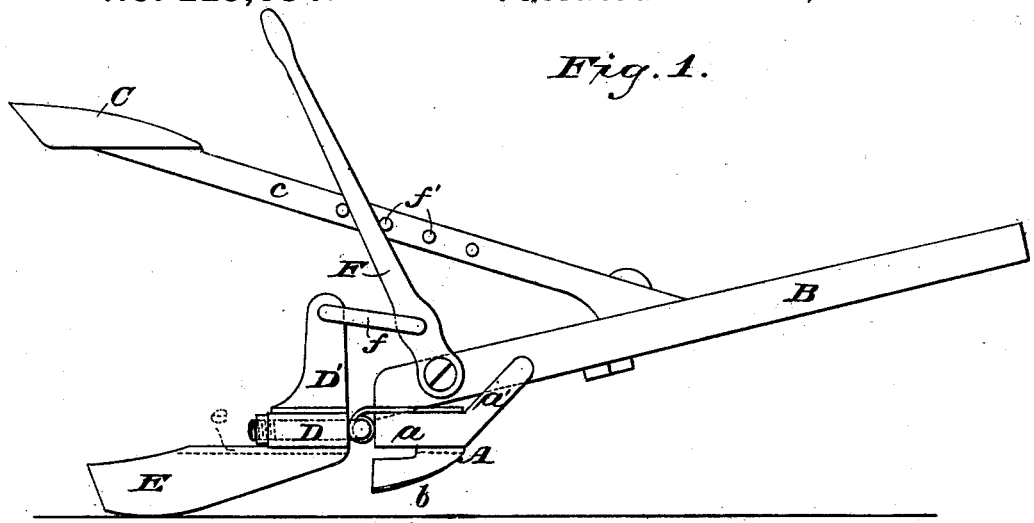
Figure 2:
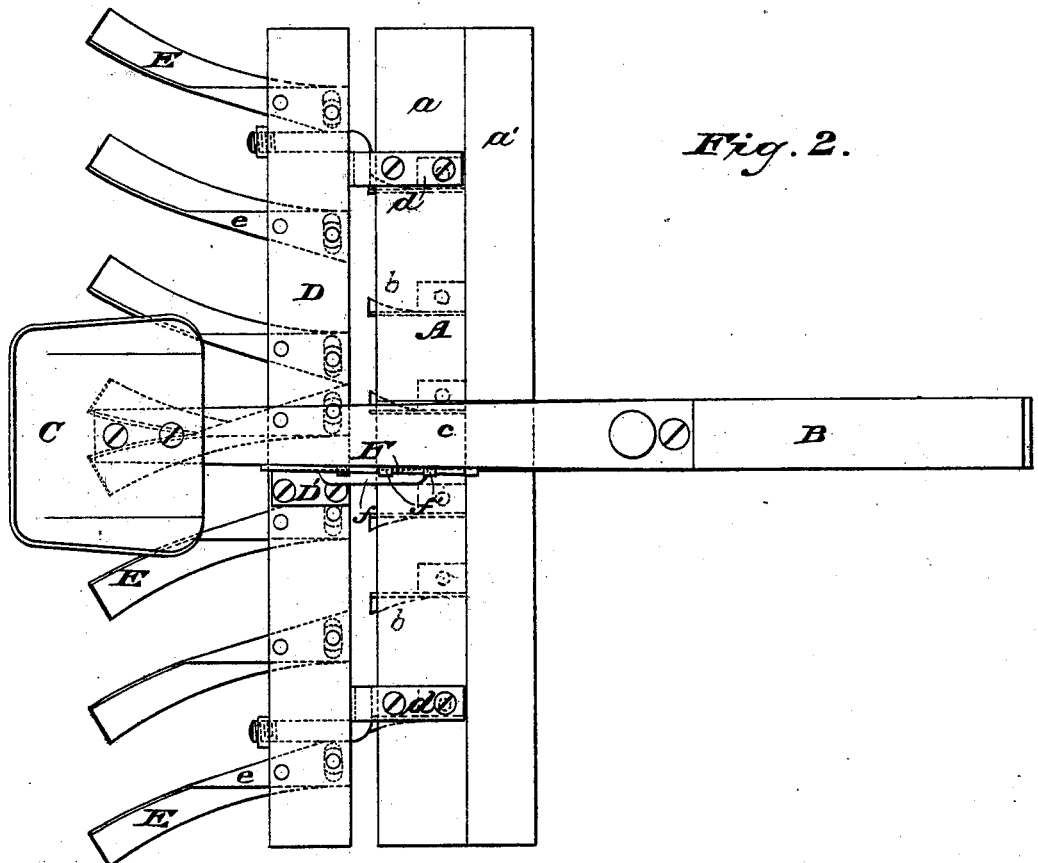

Figure 1 represents a side elevation, and Fig. 2 a plan view.

A leveler-beam and clod-crushing portion or shoe, A, of the implement is represented as composed of two parts, constituting a flat rear portion or heel, *a*, and a front portion or toe, *a'*, inclining upward and forward from the heel at an angle of about forty-five degrees, somewhat after the manner of a sled-runner, so as readily to ride upon and crush the clods, break up and level the furrows, &c., over which it passes.

Small spurs or cutting-teeth *b*, fixed to the leveler so as to operate on the soil between the cultivating devices presently to be described, cut into clods, &c., and aid in leveling and preparing the ground.

A tongue, B, projects forward centrally from the clod-crusher and leveler, to which it is firmly secured against both vertical and horizontal lateral strains. It may, however, if preferred, be made adjustable, both vertically and horizontally, by well-known means suitable for holding it rigidly when properly adjusted.

A driver's seat, C, is shown as mounted on a standard, *c*, secured to the tongue and projecting upward and backward behind the implement or over the cultivator devices. It might obviously be made adjustable on its support in well-known ways; or this supporting-standard might be mounted on the leveler or crusher A itself, or be connected with both the leveler and tongue. The seat in any event overhangs the cultivating devices.

A gang-bar or cultivator-frame, D, provided with a gang of suitable cultivators, preferably such as presently to be described, and in a single row transverse to the line of draft, is hinged or pin-jointed to the rear of the shoe by proper hinges, *d*, so as to permit it to swing up and down or play vertically in adjusting.

A gang of cultivator teeth or shares, E, secured upon the cultivator-frame or gang-bar D, project backward therefrom. These teeth or shares are lowest near their heels, from whence they slightly incline upward and forward along their cutting-edges. They also curve downward and outward, or both vertically and horizontally, somewhat like a portion of a propeller-blade or plowshare, so as to turn a furrow upward and outward as they cut their way through the soil.

Each share E is made of a single plate or piece of steel flanged or bent at the forward end or shank portion, e, to form the peculiar angular shank and flat bearing-seat provided with the pivot-hole and adjusting-slot, as shown, through which slot and hole bolts or screws pass to hold the share to the gang-bar and admit of varying adjustment, as will readily be understood.

A post or standard, D', on the hinged gang-bar D is, in this instance, connected by a link, f, with a rocking hand-lever, F, pivoted on the tongue or shoe, and rocking on its pivot in a vertical plane. Stop-pins f' on the standard c, or other well-known equivalent devices, serve to limit the range of movement of the hand-lever, and consequently regulate the relative position or angular relation of the leveler beam or shoe to the gang-bar or cultivator-frame.

The hand-lever might, if preferred, be controlled as to its movements by means of the well-known sector-rack mounted on the tongue or leveler and crushing-shoe and a spring-detent on the hand-lever; but the plan shown is more simple and less expensive.

The operation of the implement will readily be understood from the foregoing description, from which it will be seen that as dragged over the ground the leveler and crusher levels the surface and breaks up the clods, broken or unevenly-turned furrows, &c., and the small teeth or spurs on the leveling-beam scarify the soil and cut up hard lumps. In stiff or clayey land and unevenly-broken soil the spurs materially aid in the preparation of the ground for the action of the cultivating shares or teeth. These shares can be made to penetrate but slightly into and skim lightly over the ground by shoving the hand-lever well forward. When this lever is locked in the forward position the weight is mainly on the heel of the leveler, and the machine may thus be transported from place to place without turning up the soil. The farther backward the lever is held the deeper the teeth take into the ground before the weight of the driver comes upon the leveler and crusher-beam, and the organization is such that the entire weight of the machine and of the driver may be brought to bear upon the shares, thus affording a wide range of adjustment of the pressure or of the relative positions of the parts to the surface of the ground and to each other.

The parts, however they may be adjusted, are held rigidly relatively to each other, and the weight to be sustained is either wholly or partially supported by the cultivator portion. Even in transportation there is necessarily some weight on the shares to balance the implement. Any obstruction to the passage of the leveler sufficient to raise it correspondingly raises the gang-bar and transfers the weight or part of it from the gang-bar to the leveler, and in this way hard clods are crushed and unevenly-plowed land is effectually prepared for the action of the shares, which thoroughly cultivate it.

I do not claim, broadly, or by themselves, a sled-shaped shoe or crusher and leveler, nor such a device with a driver's seat mounted on it, nor a hinged gang-bar or cultivator-frame, as these elements are all old in different machines; but, so far as I am aware, I am the first to embody in one agricultural implement the instrumentalities herein claimed.

I claim as of my own invention—

1. The combination, substantially as hereinbefore set forth, of the leveler or clod-crusher, the rigid tongue, the gang-bar with cultivating devices in rear of the leveler, and the driver's seat, mounted on the leveler or tongue and overhanging the gang-bar.

2. The combination of the leveler or clod-crusher, the rigid tongue, the hinged gang-bar or cultivator-frame provided with the cultivating devices and hinged in rear of the leveler, the driver's seat overhanging the gang-bar and supported on a standard secured to the leveler or tongue, and means for adjusting the gang-bar and leveler relatively to each other and for securing them as adjusted, substantially as and for the purpose set forth.

In testimony whereof I have hereunto subscribed my name.

FREDERICK NISHWITZ.

Witnesses:
WM. J. PEYTON,
GIBBES M. MAYNADIER.